United States Patent
Neal (10) Patent No.: US 6,192,518 B1
(45) Date of Patent: Feb. 20, 2001

(54) METHOD FOR DISTRIBUTING SOFTWARE OVER NETWORK LINKS VIA ELECTRONIC MAIL

(75) Inventor: Douglas Edward Neal, Howell, MI (US)

(73) Assignee: MIS ONLY, Inc., Los Angeles, CA (US)

(*) Notice: Under 35 U.S.C. 154(b), the term of this patent shall be extended for 0 days.

(21) Appl. No.: 09/010,605

(22) Filed: Jan. 22, 1998

(51) Int. Cl.$^7$ .................................................. G06F 9/445

(52) U.S. Cl. ............................................. 717/11; 709/221

(58) Field of Search ................................ 395/712, 200.33, 395/200.47–200.54; 455/38.1, 38.2, 33.1, 54.1, 54.2, 66, 68, 69, 70, 88, 89, 186.1, 67.1, 226.1, 422–424, 517, 550–556, 7, 575, 418–420; 379/57, 58, 63, 61, 62; 340/825.44, 825.54, 825.22; 707/200, 203; 709/203, 217–223

(56) References Cited

U.S. PATENT DOCUMENTS

| | | | |
|---|---|---|---|
| 4,558,413 | 12/1985 | Schmidt et al. ...................... | 707/203 |
| 4,780,821 | 10/1988 | Crossley .............................. | 709/100 |
| 4,951,192 | 8/1990 | Chase, Jr. et al. .................. | 395/706 |
| 5,008,814 | * 4/1991 | Mathur ............................ | 395/200.51 |
| 5,155,847 | * 10/1992 | Kirouac et al. . | |
| 5,247,683 | 9/1993 | Holmes et al. ...................... | 709/221 |
| 5,263,164 | 11/1993 | Kannady et al. ...................... | 713/1 |

(List continued on next page.)

FOREIGN PATENT DOCUMENTS

| | | |
|---|---|---|
| 19714521 | 11/1997 | (DE) . |
| WO 94/25923 | 5/1994 | (WO) . |
| WO 94/25924 | 5/1994 | (WO) . |
| WO 97/00475 | 1/1997 | (WO) . |

OTHER PUBLICATIONS

Phil Barthram, et al., "Distribution Management—ICL's Open Approach," ICL Technical Journal, pp. 702–717, Nov. 1991.

Carl W. Symborski, "Updating Software And Configuration Data In A Distributed Communications Network," IEEE, pp. 331–338, 1988.

"Reference Monitor—Location Of Resource Access," IBM Technical Disclosure Bulletin, vol. 32, No. 10A, p. 335, Mar. 1990.

Stan Miastkowski, "Rx for Your PC: Utilities Use the Web to Prescribe Software Updates and Fixes", PC Word, p. 54, Jan. 1997.

Tony Gale, "The Evolution Within ICL Of An Architecture For Systems Management," ICL Technical Journal, pp. 673–685, Nov. 1991.

L. Brooks Hickerson, et al., "Managing Networked Workstations," IEEE Spectrum, pp. 55–58, Apr. 1992.

(List continued on next page.)

Primary Examiner—Kakali Chaki
(74) Attorney, Agent, or Firm—Merchant & Gould PC (57) ABSTRACT

The present invention discloses a method, apparatus, and article of manufacture for distributing a software application residing on a network, from a source computer coupled to the network, to a remote computer via electronic mail.

At the source computer, the present invention identifies the software installation components that reside on the source computer. These software installation components are used to install the software application. The identified software installation components are compared to the remote computer's software installation components. This comparison determines which software installation components are missing from the remote computer. To provide the files required for installation of the software application, the present invention transfers the missing software installation components from the source computer to the remote computer.

9 Claims, 9 Drawing Sheets

U.S. PATENT DOCUMENTS

| | | | |
|---|---|---|---|
| 5,282,273 | 1/1994 | Ushio et al. | 709/218 |
| 5,307,354 | 4/1994 | Cramer et al. | 714/4 |
| 5,421,009 | 5/1995 | Platt | 709/221 |
| 5,581,764 | 12/1996 | Fitzgerald et al. | 395/703 |
| 5,602,991 | 2/1997 | Berteau | 709/227 |
| 5,666,501 | 9/1997 | Jones et al. | 345/348 |
| 5,675,802 | 10/1997 | Allen et al. | 395/703 |
| 5,684,952 | 11/1997 | Stein | 709/221 |
| 5,689,825 | 11/1997 | Averbuch et al. | 455/575 |
| 5,694,546 * | 12/1997 | Reisman | 705/26 |
| 5,706,437 * | 1/1998 | Kirchner et al. | 395/200.33 |
| 5,721,824 * | 2/1998 | Taylor | 395/200.33 |
| 5,727,159 * | 3/1998 | Kikinis | 395/200.76 |
| 5,734,898 | 3/1998 | He | 395/703 |
| 5,742,829 * | 4/1998 | Davis et al. | 395/712 |
| 5,752,042 | 5/1998 | Cole et al. | 395/712 |
| 5,790,796 * | 8/1998 | Sadowsky | 395/200.51 |
| 5,809,251 * | 9/1998 | May et al. | 395/200.53 |
| 5,812,857 * | 9/1998 | Nelson et al. | 395/712 |
| 5,845,077 * | 12/1998 | Fawcett | 395/200.51 |
| 5,845,090 * | 12/1998 | Collins III et al. | 395/200.51 |
| 5,859,969 * | 1/1999 | Oki et al. | 395/200.3 |
| 5,860,012 * | 1/1999 | Luu | 395/712 |
| 5,867,714 * | 2/1999 | Todd et al. | 395/712 |
| 5,878,434 * | 3/1999 | Draper et al. | 707/202 |
| 5,881,236 * | 3/1999 | Dickey | 395/712 |

OTHER PUBLICATIONS

Orbiter Product Description, "Systems Management For Mobile Computing", Callisto Software, Inc., pp. 1–8, Nov. 1997.

Dialog Search Report, pp. 1–51, Jun. 1998.

Nerac Search Report, pp. 1–10, Jun. 1998.

Busse, "winiInstall installs Windows apps from central location" Infoworld, May 24, 1993, pp. 54.*

* cited by examiner

File Format:

Header — 300

— 302

Compressed File Images

File Images list — 304

Script object and — 306
Snapshot definition

File Format:

Header — 300

File Images list — 304

Script object and — 306
Snapshot definition

```
Subject:                                                              ── 334
*** MobileONE Requesting Files - MBA 2.0

Text:                                                                 ── 336
This message is a request by MobileONE for additional files
to be sent in order to enforce the package specified:

message-type: AckFileRequest
package-reference: {DCA45564-45A6-11D1-B026-444553540000}             ── 340
status: Despooled into C:\Program Files\MobileONE \InWork successful  ── 342
orig-machine: DOUGREMOTE
Orig-date-local-time: Thursday, October 16, 1997 10:05:04             ── 346
Orig-date-gmt-time: Thursday, October 16, 1997 14:05:04               ── 348
package-name: snapshot.pkg
orig-message-type: Normal
node-id: {340D5901-45A7-11D1-B026-444553540000}                       ── 354
master-job-id: {99B94A90-45A6-11D1-B026-444553540000}                 ── 356
request-files-total: 3
file1: mmsystem.dll
file2: odbctrac.dll
file3: dplay.dll
```

Labels: 338 (message-type), 344 (orig-machine), 350 (package-name), 352 (orig-message-type), 358 (request-files-total), 360 (file1), 362 (file2), 364 (file3)

METHOD FOR DISTRIBUTING SOFTWARE OVER NETWORK LINKS VIA ELECTRONIC MAIL

BACKGROUND OF THE INVENTION

1. Field of the Invention

This invention relates generally to managing computers systems in a distributed network, and more specifically, to a method for distributing software over slow network links via electronic mail.

2. Description of Related Art

Many companies issue laptops, notebooks, and hand-held computers to their employees. These computers allow the employee to work both at the office and away from the office at remote locations. As a result, remote computers currently represent three out of every ten personal computers (PCs) in Corporate America. This number may increase to almost seven out of ten by the end of 1999.

Although remote computers provide flexibility, they are difficult to support when they are not connected to a local area network (LAN) based system. For example, typical methods of updating and supporting these devices involve, packaging up the devices and sending them back to a central office for new software packages and configuration changes or waiting until the devices are brought in from the field and left with system administrators for a couple of days. These methods create a significant amount of downtime and loss of productivity for businesses.

A solution to the problem involves providing access to software updates over a dial up link for remote users. Yet, the resources used to create such access are lacking in most LAN based systems.

As more remote devices become part of the standard corporate computing power, a clear need is emerging for a solution that allows remote users to connect to a LAN without bringing their computers in from the field.

SUMMARY OF INVENTION

To overcome other limitations that will become apparent upon reading and understanding the present specification, the present invention discloses a method, apparatus, and article of manufacture for distributing a software application residing on a network, from a source computer coupled to the network, to a remote computer that is not coupled to the network.

At the source computer, the present invention identifies the software installation components. These software installation components are used to install the software application. The identified software installation components are compared to the remote computer's software installation components. This comparison determines which software installation components are missing from the remote computer. To provide the files required for installation of the software application, the present invention transfers the missing software installation components from the source computer to the remote computer.

In an alternative embodiment of the present invention, the invention requests the missing software installation components from the source computers.

BRIEF DESCRIPTION OF THE DRAWINGS

Referring now to the drawings in which like reference numbers represent corresponding parts throughout:

FIGS. 2A–2F are flowcharts that illustrate the logic performed according to the present invention.

DETAILED DESCRIPTION OF THE PREFERRED EMBODIMENT

In the following description of the preferred embodiments, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention provides a unique and efficient method for distributing software to remote clients via e-mail. E-mail is a very efficient communication mechanism and typically, it is already installed in existing corporate infrastructures. The present invention utilizes these existing infrastructures to perform tasks that usually require a high-speed LAN connection.

Another objective of the present invention is maintaining required software installations and configurations for computers that are not permanently connected to a corporate network and/or computers that use dial-up networking or e-mail as their main communication mechanism.

A further embodiment of the present invention is to reduce network traffic. Unlike other software distribution systems, the present invention does not assume the state of the remote computer. Instead, the present invention determines the state of the remote computer before distributing software installation components to the remote computers. Determining the state increases the probability of distributing only the required installation components and reduces network traffic. In the present invention, the installation components comprise both software installation files and configurations settings.

Hardware Environment

Figure 1:
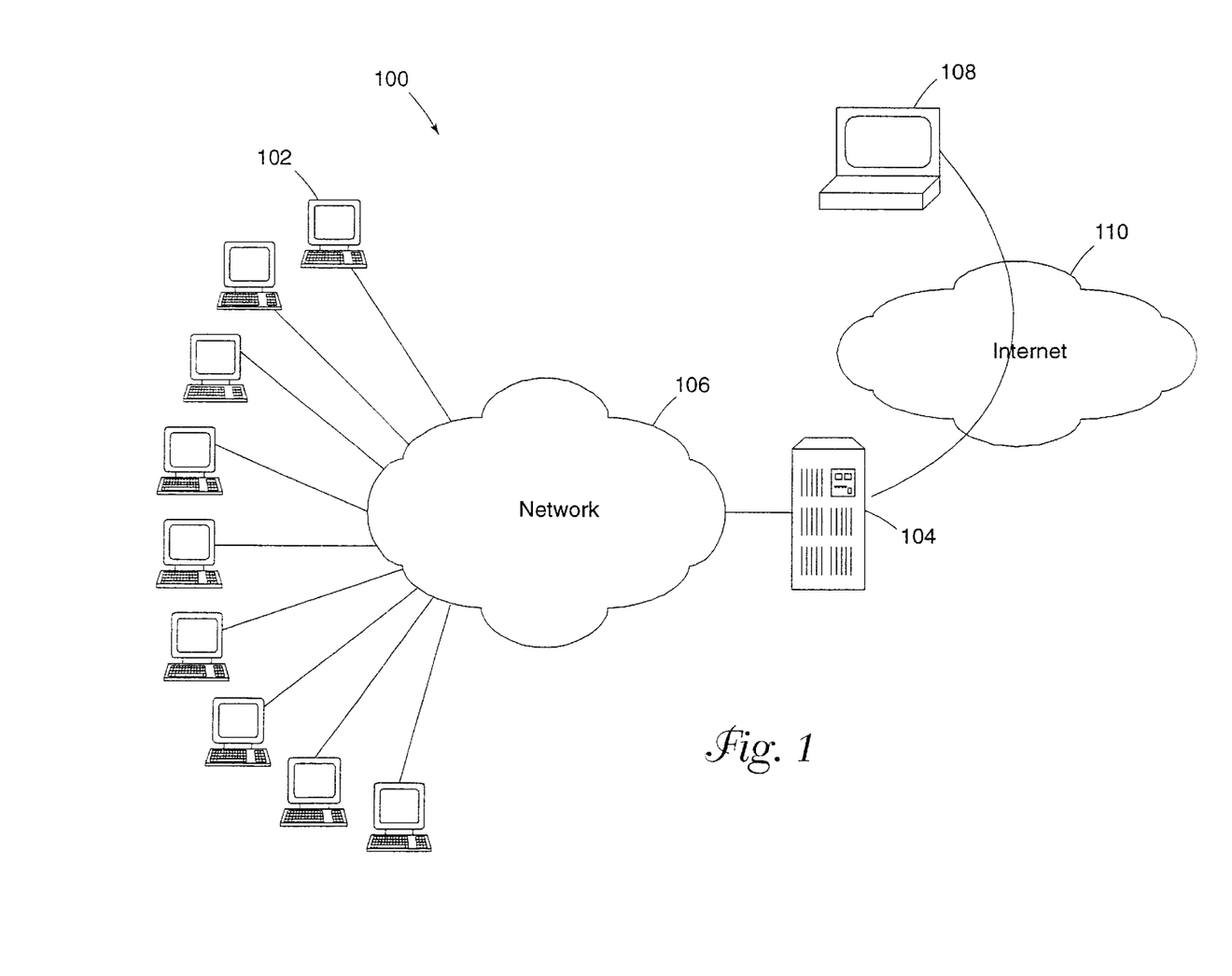
FIG. 1 illustrates an exemplary hardware environment that could be used with the present invention.

FIG. 1 schematically illustrates the hardware environment of the preferred embodiment of the present invention, and more particularly, illustrates an exemplary distributed computer system 100. A typical combination of resources may include target computers 102 that are personal computers or workstations, and source computers 104, that are personal computers, workstations, servers, minicomputers, or mainframes. These systems are coupled to one another by various networks 106, including LANs, WANs, SNA networks, and the Internet. The target computers 102 are coupled with the source computers 104 over a line or via a wireless system, such that all data flows from the source computer 104 to the target computer 102.

Remote target computers 108 are also coupled with the source computers 104. In the preferred embodiment of the present invention, the remote computers 108 may be personal computers, workstations, laptops, notebooks, and/or hand-held devices. The remote computers 108 and source computers 104 are coupled to one another by various networks 106, including the Internet 110. The remote computers 108 are coupled with the source computers 104 over a line or via a wireless system, such that all data flows from the source computer 104 to the remote computer 108. However, in the preferred embodiment of the present invention, the remote computers 108 and the source computers 104 are not coupled via a shared network 106.

Those skilled in the art will recognize that many modifications may be made to this configuration without departing from the scope of the present invention. Indeed, those skilled in the art will recognize that other alternative hardware environments may be used without departing from the scope of the present invention.

Flowcharts

Figure 2A:
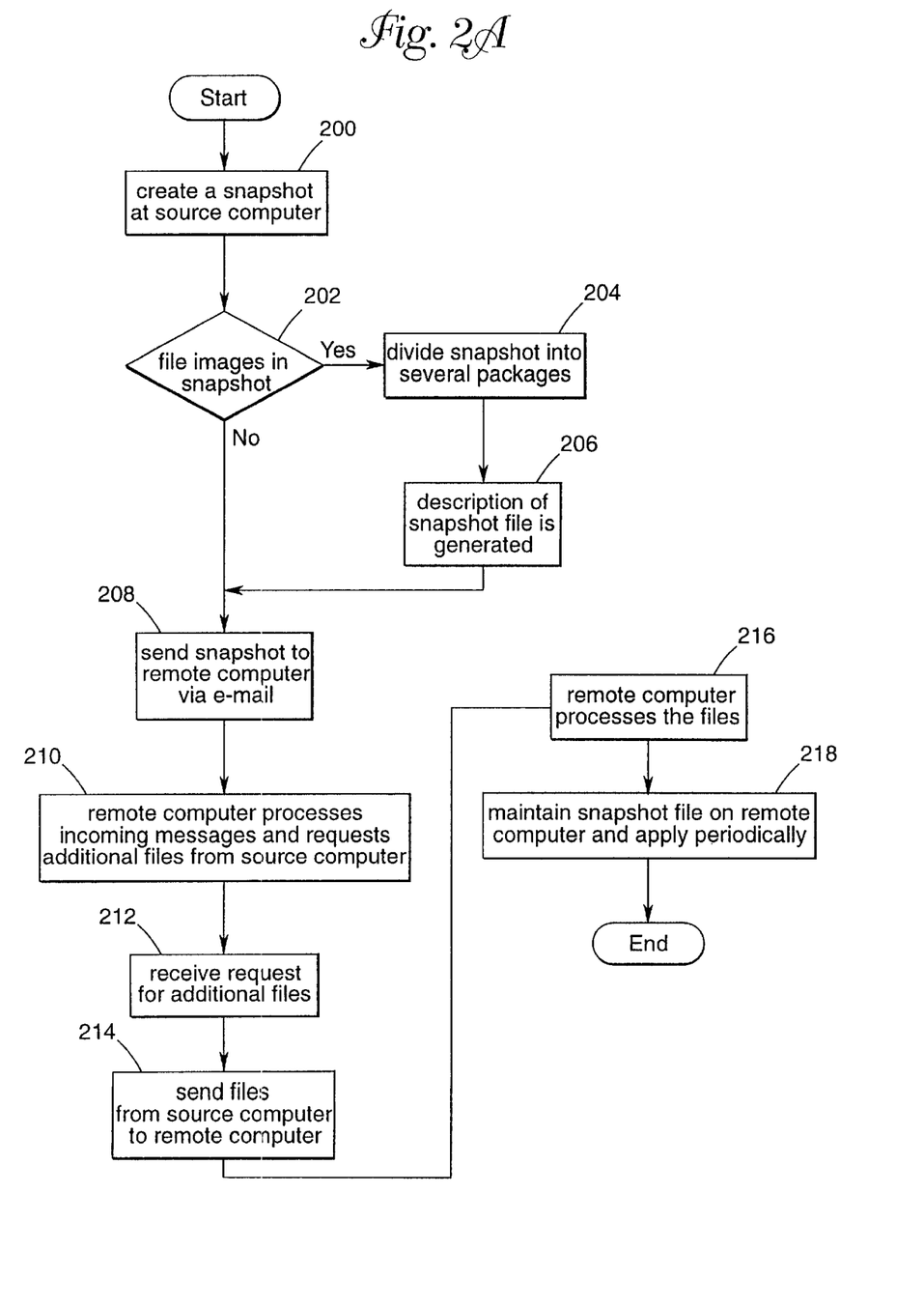

FIGS. 2A–2F are flowcharts that illustrate the logic performed according to the present invention. FIG. 2A is high-level overview of the preferred embodiment of the invention.

Block 200 represents the source computer 104 creating a snapshot of some or all of the software installation components on a source computer 104. The software installation components comprise the software files and configuration settings that are required for installing the software application to be distributed. A snapshot may be a graphical representation, a textual list or any equivalent means for identifying the required software installation components.

Block 202 is a decision block that represents the preferred invention determining whether file images are present in the snapshot. Snapshots may include several components, other than file images. For example, they frequently include registry settings, configuration files, etc. If file images are included in the snapshot, then the present invention proceeds to Block 204. Otherwise, if file images are absent from the snapshot, the present invention proceeds to Block 208.

Block 204 represents the present invention dividing the file images into several small pieces or sub-packages. These smaller sub-packages provide an efficient means of sending information to the remote user.

Block 206 represents the present invention generating a snapshot description file that describes the snapshot file, including the file images that are stored in the sub-package. This description also includes instructions for installing the distributed software application.

Block 208 represents the present invention sending the snapshot description file to the remote computer 108 via e-mail. The sub-packages are kept at the source computer 104.

Block 210 represents the present invention directing the remote computer 108 to process incoming e-mail messages. The processing involves automatically scanning the incoming e-mail messages, and identifying messages that contain the snapshot description file. Once the messages are identified, the remote computer 108 compares the snapshot description file to the remote computer 108's software installation components. This comparison determines whether the remote computer 108 is in compliance with the specifications of the snapshot. Compliance exists when the correct software files are in the correct locations on the remote computer 108; the remote computer 108's software files are the same or more recent version of the source computer 104's software files; and the configuration file settings are correct. If compliance between the remote computer 108 and the source computer 104 is lacking, the remote computer may request software installation components from the source computer 104.

Block 212 represents the source computer 104 receiving a request for software installation components from the remote computer 108. In the preferred embodiment of the present invention, the request is received via e-mail. Upon receiving the request, the source computer 104 retrieves the requested software installation components from the previously generated sub-package files (see block 204).

Block 214 represents the present invention sending the requested software installation components as a series of e-mail messages from the source computer 104 to the remote computer 108.

Block 216 represents the remote computer 108 receiving the series of e-mail messages that contain the requested software installation components and assembling them so that the snapshot description file can access them. The present invention then compares the source computer 104's snapshot description file to the remote computer 108's software installation components. Based on the comparison, the present invention brings the remote computer 108 in compliance with the source computer 104 by extracting sub-packages from the source computer 104.

Block 218 represents the present invention storing the snapshot file description on the remote computer. Periodically, the invention directs the remote computer to compare the snapshot file description with the remote computer 108's software installation components. This periodic comparison determines whether the remote computer's software installation components have been changed. If changes exist, the remote computer 108 extracts the required software installation components from the sub-packages. If additional files are needed, they are later retrieved from the source computer 104.

Figure 2B:
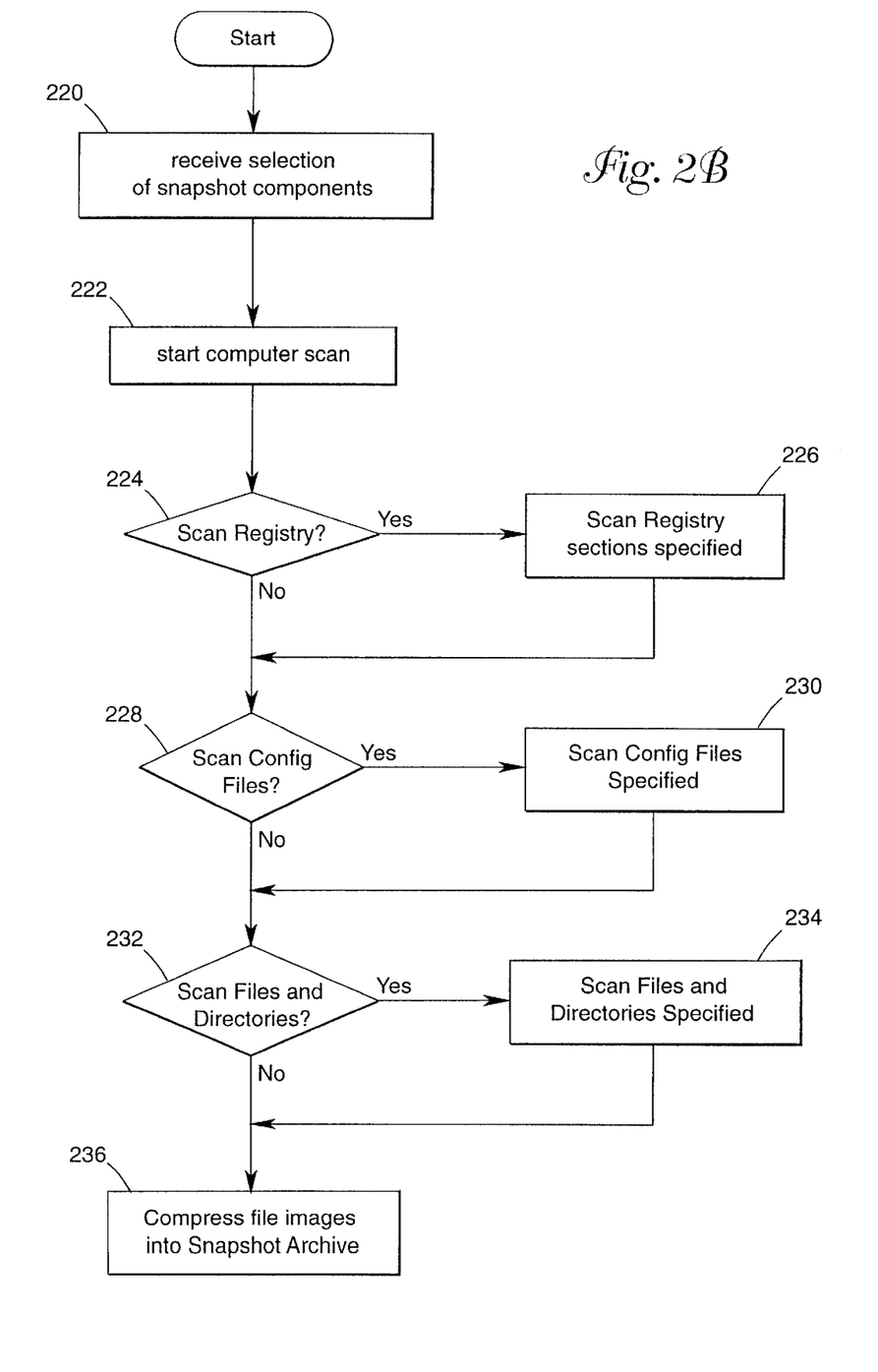

FIG. 2B is a detailed representation of the logic performed at the source computer 104 to create a snapshot sub-package. Block 220 represents the source computer 104 receiving the selection of software installation components from a user. The selection may include components from multiple source computer 104 directories, drives, configuration files (autoexec.bat, config.sys, ini.files, etc.) and Registry key entries.

Block 222 represents the present invention beginning the scan process at the source computer 104. The scanning process may be applied to Registries, configuration files, software files, and/or directories.

Block 224 is a decision block that represents the present invention determining whether to scan a Registry. If so, the invention proceeds to block 226. Otherwise the invention proceeds to block 228.

Block 226 represents the present invention scanning the registry for sections that are required for installation of the software to be distributed.

Block 228 is a decision block that represents the present invention determining whether to scan the configuration files. If so, the invention proceeds to block 230. Otherwise the invention proceeds to block 232.

Block 230 represents the present invention scanning the configuration files for configuration settings that are required for installation of the software to be distributed.

Block 232 is a decision block that represents the present invention determining whether to scan the directories. If so, the invention proceeds to block 234. Otherwise, the invention proceeds to block 236.

Block 234 represents the present invention scanning the directories for software components that are required for installation of the software to be distributed.

Block 236 represents the present invention compressing file images. Once the items have been scanned, the present invention does a special check to determine if files were included in the scan results. If they were, the file images are compressed and included as part of the snapshot package.

The snapshot package file itself is designed to be efficient in the way it stores large amounts of information. It provides the present invention with the ability to easily replace information that may change frequently without having to re-write the entire snapshot file contents (which may be several megabytes in size).

Figure 2C:
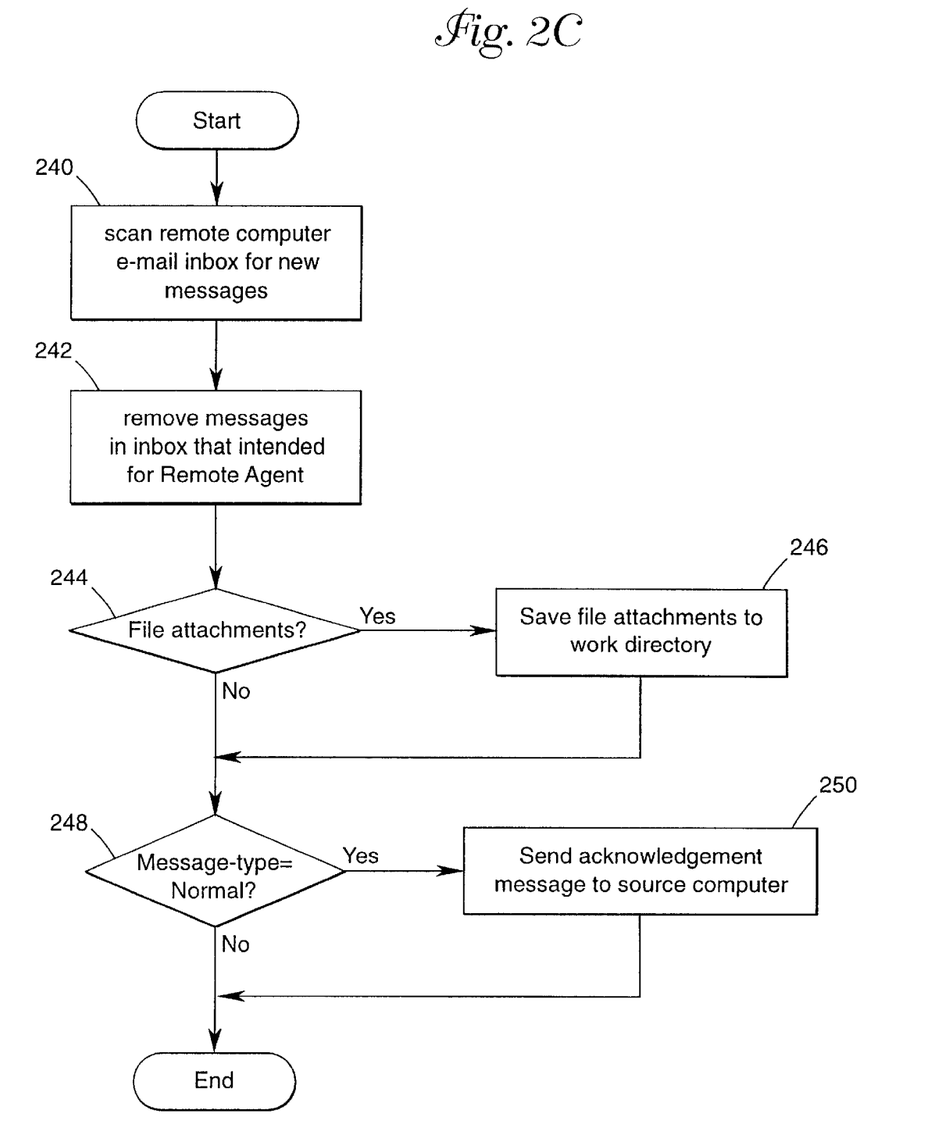

FIG. 2C is a representation of the steps performed at the remote computer 108 according to the present invention.

Block 240 represents the remote computer 108 scanning its e-mail in-box for new messages. In the preferred embodiment of the present invention, the invention searches for messages that contain the "MBA 2.0" tag in the subject text of the e-mail messages in the in-box.

Block 242 represents the present invention removing tagged messages from the remote computer 108's e-mail in-box. When a message is found with the "MBA 2.0" subject text, it is removed from the e-mail in-box and processed.

Block 244 is a decision block that represents the present invention determining if any file attachments exist. If they do, the file attachments are saved to a work directory, as represented by block 246. Otherwise, the invention proceeds to block 248.

Block 248 is a decision block that represents the present invention determining if the message-type is Normal. There are several possible types of messages, including Normal, Ack, AckFileRequest. The Normal message is an e-mail message from the source computer 104. It contains files to be distributed to a remote computer 108. Ack messages are e-mail reply messages from the remote computer 108, stating that everything was received by the remote computer. AckFileRequest messages are e-mail reply messages from the remote computer 108, stating that the snapshot description file was received but, additional file images are required to continue processing.

If the message is Normal, an acknowledgment e-mail message is sent from the remote computer 108 to the source computer 104. The purpose of this message is to let the source computer know that the message was received successfully, as represented in block 250.

Figure 2D:
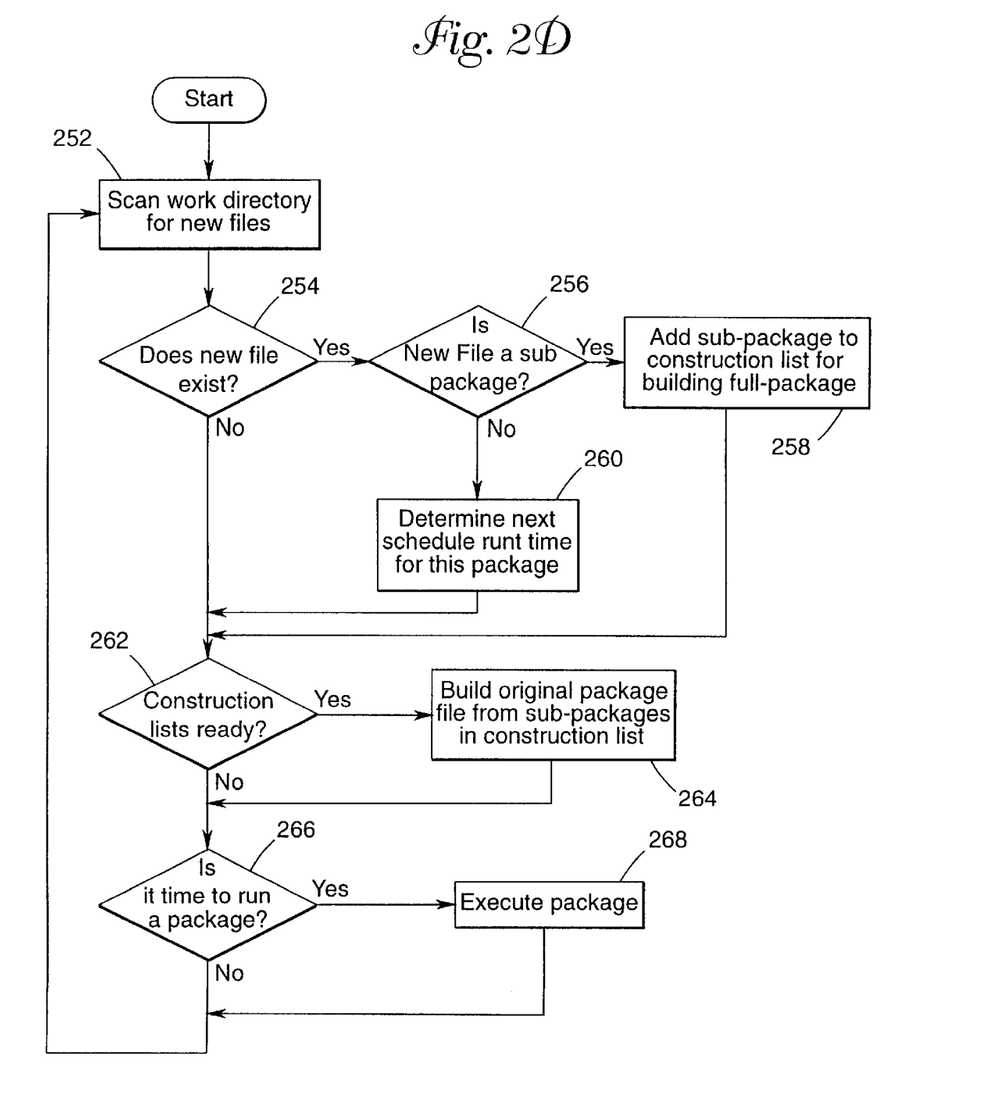

FIG. 2D is a representation of the logic required to process the packages and sub-packages at the remote computer 108. Block 252 represents the remote computer 108 scanning a work directory for any new files or files where date/time and/or size have changed.

Block 254 is a decision block that represents the present invention determining if a new file exists. If so, the present invention proceeds to block 256. Otherwise, the present invention proceeds to block 262.

Block 256 is a decision block that represents the present invention determining if the new file is a sub package or a Normal package. If the file is a sub-package, it's name and location is added to a construction list, as represented by block 258. This construction list is used for tracking sub-packages as they arrive to the remote computer 108. The tracked sub-packages may be built into a Normal package. Otherwise, if the file is not a sub-package, then it is a Normal package file and control proceeds to block 260.

Block 260 represents the present invention reading the Normal package's schedule and determining when to execute the next snapshot package.

Block 262 is a decision block that represents the present invention checking the remote computer 108's construction list(s) for sub-packages that are ready to be merged together to form a Normal package file. If all sub-packages are ready, then control proceeds to block 264. Otherwise, control proceeds to block 266.

Block 264 represents the present invention building the original Normal snapshot file package. All sub-packages are combined to create the Normal package. Once the Normal packages are formed, the present invention directs the remote computer 108 agent to execute the snapshot description file. The remote computer 108 agent performs tasks at the remote computer 108, under the direction of the present invention. Executing a snapshot description file involves scanning the remote computer for software components that correspond to the snapshot description file contents and performing a comparison against the snapshot description file. If no file images are required to make the remote computer comply with the snapshot description, then the snapshot is performed again and allowed to make changes to the remote computer 108. If file images are required to complete the software application installation, the agent sends an e-mail message back to the source computer 104 for the required files. As a result, only the required files will be sent back over e-mail from the source computer 104 to the remote computer 108.

Block 266 is a decision block that represents the present invention checking the next run date and time field for all known package files that exist in the work directory. If it is time to the run the package, the package is executed, as represented by block 268. Otherwise, control returns to block 252 where the present invention continues processing new packages as they arrive and keeps launching packages that have schedules to run on a repetitive basis.

Figure 2E:
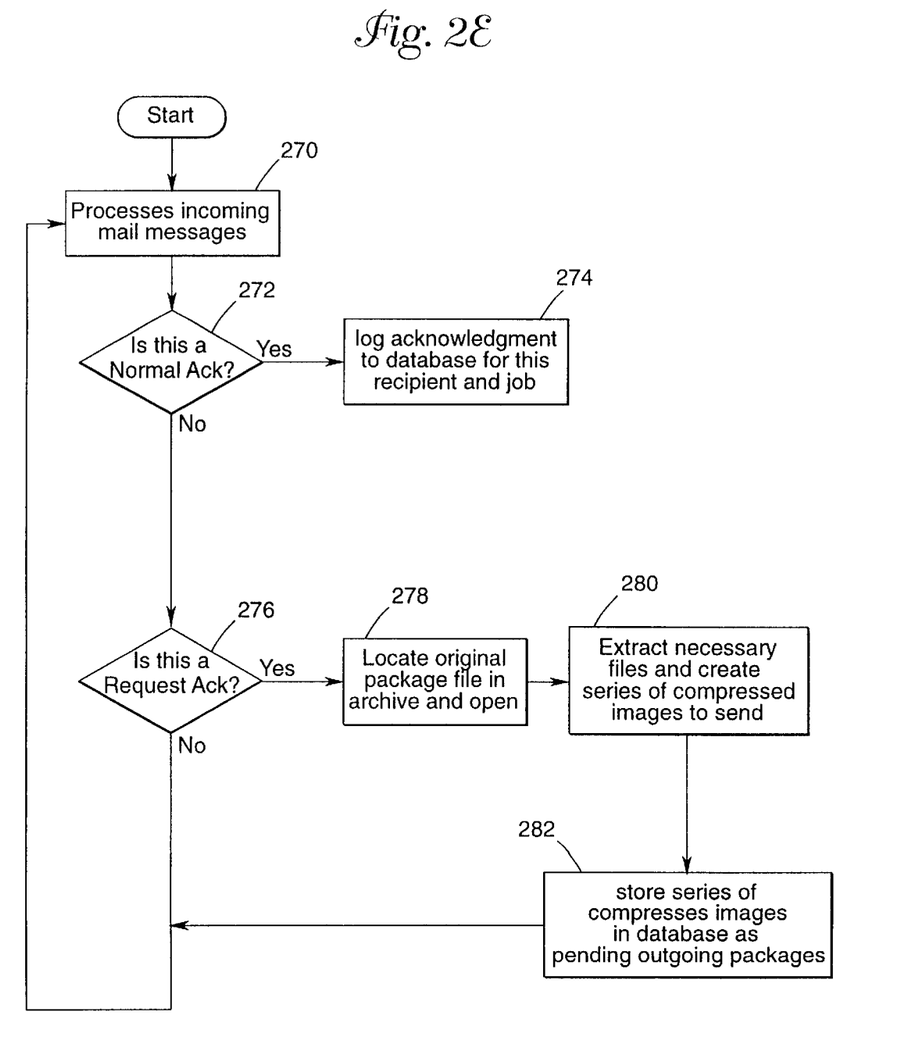

FIG. 2E illustrates the logic performed by the source computer 104 when it processes the remote computer 108's request for additional files.

Block 270 is a representation of the present invention processing the incoming e-mail message at the source computer 104. The source computer 104 receives the request for additional files from the remote computer 108 by scanning the incoming e-mail messages and looking for the messages with a subject text that contains "MBA 2.0."

Block 272 is a decision block that represents the present invention determining if the message is an Ack message. If so, the acknowledgment message is logged in the database to denote a successful transmission of a particular package to a particular remote computer 108 recipient, as represented by block 274. Otherwise, control proceeds to block 276.

Block 276 is a decision block that represents the present invention determining whether the file is a AckRequestFile or request for additional files request. If the message is an AckRequestFile, control proceeds to block 278. Otherwise, control returns to block 270.

Block 278 represents the present invention locating the original package as specified in the e-mail message. For example, FIG. 3D shows an exemplary original package. The package name 350 is snapshot.pkg and the message type 352 is Normal.

Block 280 represents the present invention extracting the necessary files from the original snapshot package and creating a series of sub-packages that contain the file images to be sent to the remote computer. In the exemplary message represented by FIG. 3D, the total number of requested files 358 is three, as illustrated by file1 360, file2 362 and file3 364, respectively.

Block 282 represents the present invention storing a series of compressed file images (sub-packages) as pending outgoing e-mail messages. Periodically, the source computer scans it's database for outgoing messages and sends them via e-mail to the remote computer 108 for processing. The pending outgoing messages are sent to the remote computer 108 in an efficient manner that minimizes the amount of data going through the e-mail system. Several methods are used to reduce the amount of data flowing through the e-mail system.

The first method involves analyzing the database table of pending outgoing e-mail messages at the source computer 104. The outgoing messages that contain the same file attachments are grouped together into a single e-mail messages with multiple recipients. This grouping allows the e-mail system to send one file attachment to many recipients and move smaller amounts of information through the network and corporate infrastructure.

A second method for reducing network traffic involves sending information to the remote computers during a specified time interval. For example, if the remote computer 108's request for additional files causes the source computer 104 to generate ten separate compressed images for transfer via e-mail, the source computer 104 may specify that only the first message of the ten be sent to the remote computer 108, and that the remaining nine wait. Once the source computer 104 receives an Ack message for the first file image, it will then release the second file image to the remote computer 108. This process continues until all ten file images are successfully sent. If during this process, one of the files fails to reply with an Ack, the source computer 104 will wait until a user defined time-out length has elapsed and then it will send out a small test message to the remote computer. This small test message contains the same information as the Normal e-mail message does except no file attachment is included. This is done so that the link between the source computer 104 and the remote computer 108 can be established as successful without re-sending large amounts of data. The test message is acknowledged by the remote computer 108 with either success (the file image in question did arrive successfully) or failure (the file image in question did not arrive). Additionally, the test messages can also time-out. In this case, subsequent test messages are sent until a user specified number of attempts is reached. If the test message acknowledgment is successful then the source computer 104 will move on to the next file in the sequence. If the test message is a failure, then the source computer 104 will re-send the file image specified since it has been determined that the remote computer 108 is available (since it was able to respond to the test message).

Snapshot Files

FIGS. 3A–3D illustrate exemplary file formats of a snapshot file created according to the present invention.

Figure 3A:
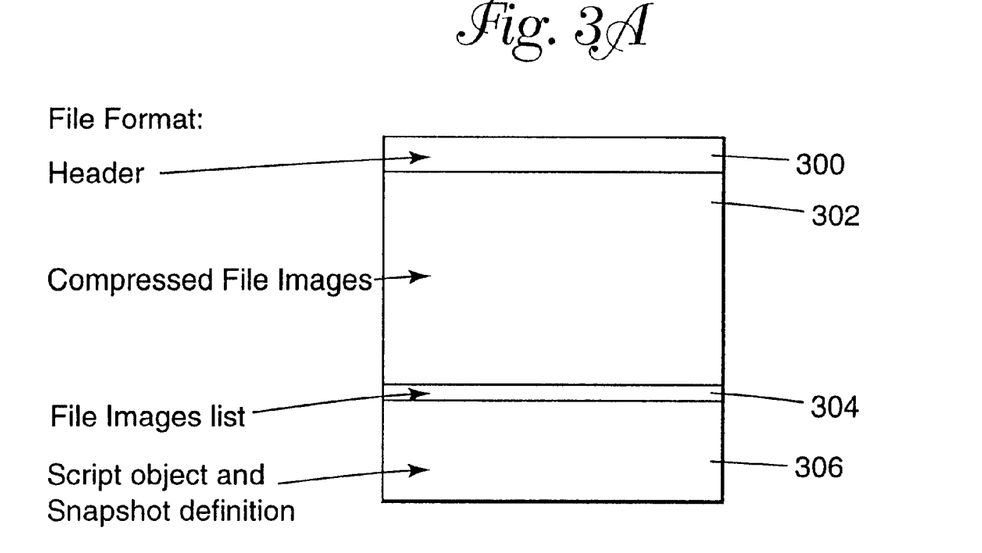
FIGS. 3A–3D illustrate exemplary file formats of a snapshot file created according to the present invention.

In FIG. 3A, the snapshot package file format is described. The overall structure of the file is broken down into four major sections. The Header 300, located at the top of the file, is a small fixed-size block of the file. It describes the basics of the file format. The Header 300 block is described in detail by Table 1. The next major section of the snapshot package file is the Compressed File Images section 302. This is potentially a very large section of the snapshot file since the compressed images may total hundreds of megabytes of data. The next major section of the snapshot file is the File Image List 304. The File Image List is a list of all the files in the Compressed File Image section 302 and it includes the file name, size, date/time, version and offset inside the Compressed File Image block. The last major section of the snapshot package file is the Script object and Snapshot definition 306. This section contains the script object that defines what components of the computer (files, configuration settings, Registry entries) should look like and how to change them. In the preferred embodiment of the present invention, both the File Images list 304 and the Script object and Snapshot definition 306 are kept at the end of the snapshot package file so that they can be changed and written back to the snapshot package file without having to re-write the entire File Images section.

Figure 3B:
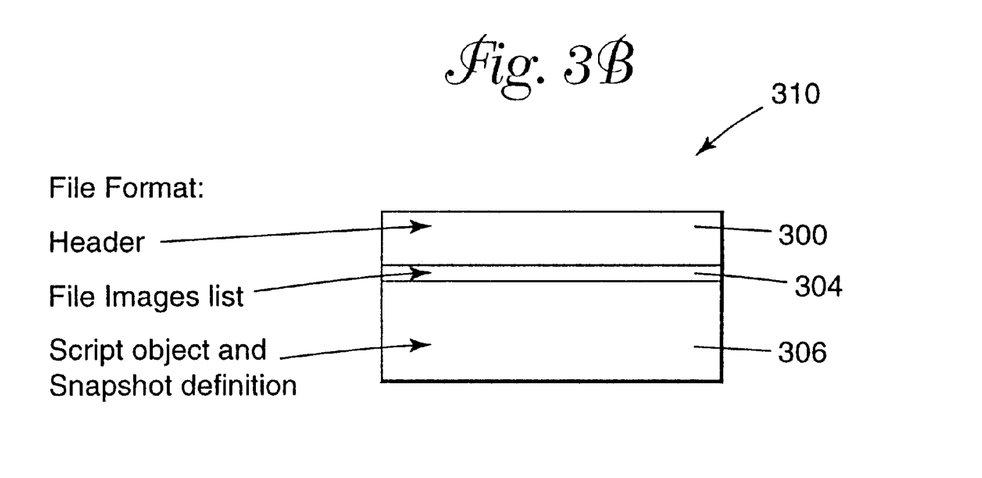

FIG. 3B. illustrates an exemplary snapshot description file 310. The description file contains only the File Header 300, File Image List 304 and Script object/snapshot definition 306. After the snapshot description file has been created, it is sent to the remote computers 108 via e-mail.

Figure 3C:
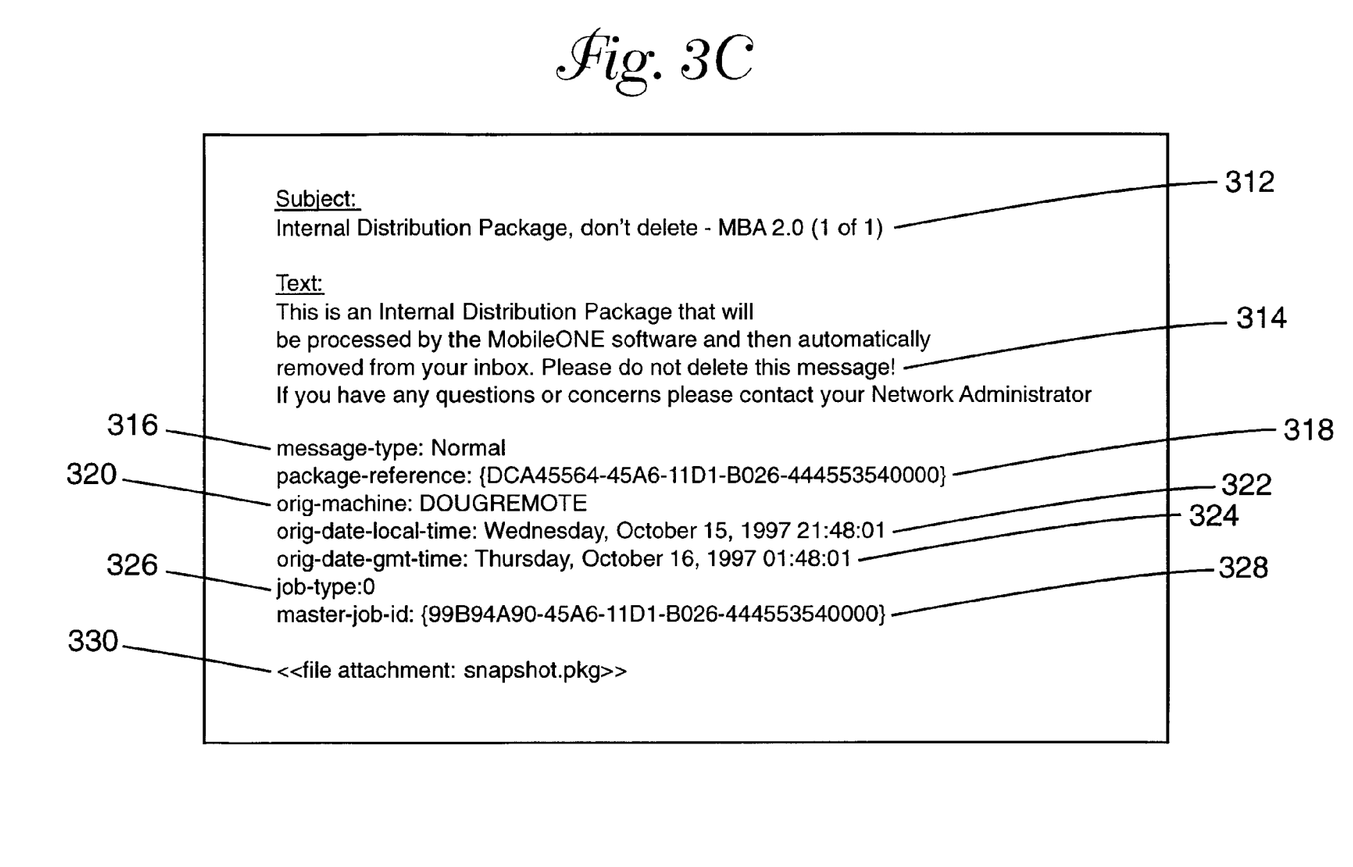
Figure 3D:
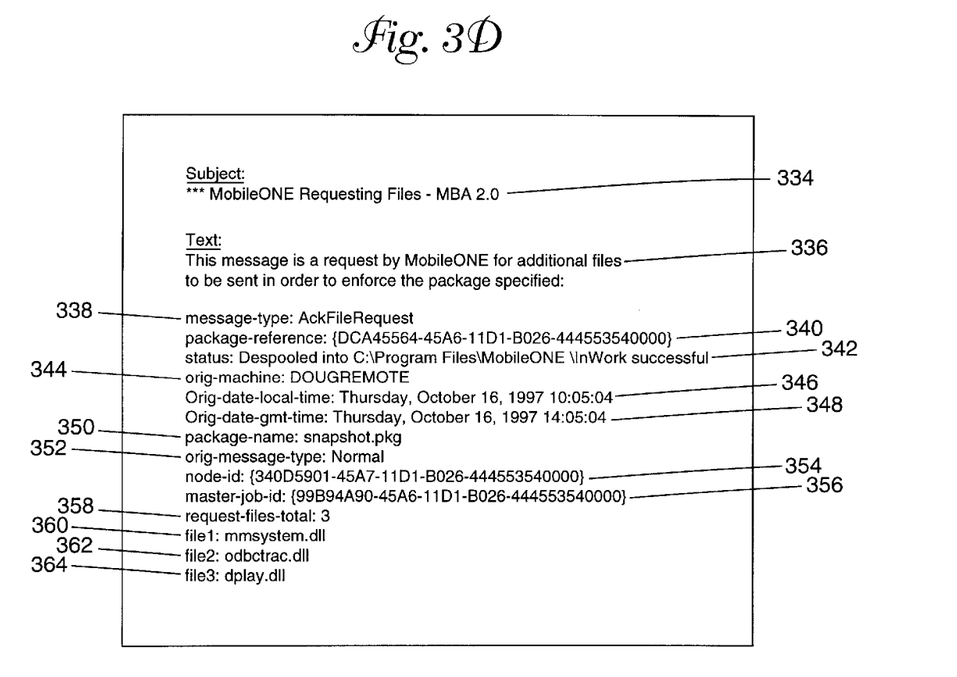

FIG. 3C displays the format of the e-mail message. In this diagram, the subject text 312 contains a unique tag "MBA 2.0" which is the key identifier that the present invention will look for when trying to find incoming mail messages at the remote computer that are destined for the remote computer and not the remote user. The text of the e-mail message 314 is fully customizable by the user and provides information to the remote user in case they read the message before the remote computer 108 agent software can read the message and process it. The remaining information in the e-mail message, 316 through 328, respectively, specifies the details about the package being sent. Lastly, the snapshot description file attachment 330 is included. The message-type 316 describes what type of message this e-mail message represents. There are several possible types—Normal, Ack, AckFileRequest. The Normal message is an outgoing e-mail message from the source computer that contains files to be distributed to a remote computer. Ack messages are replies from the remote computer that everything was received and are processed by the source computer. AckFileRequest messages are replies from the remote computer that the snapshot description file was received but additional file images are required to continue processing. The package reference 318 is a unique 128-bit identifier of the package that is being sent and is included in the both the Ack and AckFileRequest messages for insuring that the original file is referenced accurately for additional file images and status updates. This is the same i.d. that is used in the file header (see Table 1, m_id guid). The orig-machine item 320 is a textual name that represents which machine sent the message. The orig-date-local-time 322 and orig-date-gmt-time 324 are date/time representations for when the e-mail message was sent from the source computer. The first date/time field is in local time and the second is in GMT or Universal time. The next field is the job-type 326, which denotes additional information for special distribution jobs and settings. The master-job-id field 328 is used to group multiple e-mail messages that go out at the same time with a logical distribution job as specified by the user. The file attachment 330 is located at the end of the e-mail message.

Conclusion

This concludes the description of the preferred embodiment of the invention. The present invention discloses a method, apparatus, and article of manufacture for distributing a software application residing on a network 106, from a source computer 104 coupled to the network 106, to one or more remote computers 108 that are not coupled to the network 106.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

File: Header Format

| Field Name | Field Type | Size (bytes) | Description |
|---|---|---|---|
| m_signature_guid | GUID | 16 | File format signature, identifies this as snapshot file format. |
| m_wVersion | WORD | 2 | File format version (High byte is most significant) |
| m_dwFlags | DWORD | 4 | File format flags |
| m_id_guid | GUID | 16 | Unique signature for this specific file |
| m_dwFileSize | DWORD | 4 | Last known size of whole file |
| posFirstFileImage | SF_POSITION | 16 | Position of first file image inside archive. Also contains reference to sub-file index if file image stored in another file. |
| posFirstFileList | SF_POSITION | 16 | Position of file list in archive, always second to last object in the file |
| m_posScriptFile | SF_POSITION | 16 | Position of script file, always last object in the file. |
| m_wSubFileAccessMethod | WORD | 2 | Identifies method that file images can be accessed |
| m_dwSequence | DWORD | 4 | Sequence of file images |
| m_dwMaxSubFileSize | DWORD | 4 | Maximum sub file Size |
| m_dwLastSubFile | DWORD | 4 | Index of last sub file 'n' |
| m_szServer | char | 256 | Path to server name where files are stored |
| m_szUserName | char | 65 | User name to use when connecting to server path |
| m_szPassword | char | 65 | Password to use when connecting to server path |
| m_sZLocation | char | 256 | Location on server for file images |
| m_bUseRas | BOOL | 2 | Flag specifying whether to use Remote Access Server (RAS) when connecting to server. |
| m_bPromptMedia | BOOL | 2 | Prompt media flag, use this flag to specify that the user will be prompted for inserting media before continuing. File images are contained on that media |
| m_szMediaLabel | char | 65 | Text description of media that the user will be prompted to insert if m_bPromptMedia is set TRUE |
| m_szPkPassword | char | 33 | Password assigned to package |
| m_nScriptSize | DWORD | 4 | Size of script object (compressed) in file |
| m_GroupID | GUID | 16 | Package file i.d. of parent package if this file is a sub-package |
| m_wSequence | WORD | 2 | Sequence of this sub-package |
| m_wTotal | WORD | 2 | Total of sub packages |
| m_dtLasRun | DATE | 8 | Date/time stamp that this package was last run |
| m_wStartLabelID | WORD | 2 | Starting script object label for execution |
| m_OriginalID | GUID | 6 | Original package i.d. that this package was generated from (used for sending descriptions of packages) |
| m_byOriginalFileName | BYTE | 66 | Original package filename |
| RESERVED | DWORD | 14 | Reserved filed for future use |

Structure: SF_POSITION Format

| Field Name | Field Type | Size (bytes) | Description |
|---|---|---|---|
| dwSequence | DWORD | 4 | Index of sub file that contains file image at this position or zero for the current/main file. |
| dwOffset | DWORDLONG | 8 | Offset of file image inside this file |
| RESERVED | DWORD | 4 | Reserved field for future use |

Flags: PackageFlags Enumerated

| Flag Name | Value | Description |
|---|---|---|
| PH_FLAG_READONLY | 0x00000001 | Package is Read-only |
| PH_FLAG_SUBPACKAGE | 0x00000002 | Package is a sub-package |
| PH_FLAG_PASSWORDREQUIRED | 0x00000004 | Password is required to open |
| PH_FLAG_RUNONCEANDDELETE | 0x00000008 | Execute package once, then delete it |
| PH_FLAG_DELAYFILEMODS | 0x00000010 | Delay all the modifications until next time the computer restarts |
| PH_FLAG_REBOOT | 0x00000020 | Reboot the computer after package completes |
| PH_FLAG_REBOOTALWAYS | 0x00000040 | Always reboot after package completes |
| PH_FLAG_REBOOTPROMPT | 0x00000080 | Prompt before rebooting computer |
| PH_FLAG_REBOOTFORCE | 0x00000100 | Force termination of all |
| PH_FLAG_SCRIPTCOMPRESSED | 0x00000200 | Script object is compressed |
| PH_FLAG_PROFILEVIEW | 0x00000400 | Script object is a profile/snapshot |
| PH_FLAG_REQUESTFILESIFNEEDED | 0x00000800 | Request files as needed |
| PH_FLAG_DISTRIBUTED | 0x00001000 | File images are distributed among sub files |
| PH_FLAG_SUBFILE | 0x00002000 | This is a sub file |
| PH_FLAG_BACKUPFILE | 0x00004000 | This is a backup file |
| PH_FLAG_FORCECREATE | 0x00008000 | Force creation of file during open |
| PH_FLAG_SKIPSEMAPHORE | 0x00010000 | Skip opening file semaphore |
| PH_FLAG_INCLUDESFILEIMAGES | 0x00020000 | Include the file images |
| PH_FLAG_REPLACEOLDERFILESONLY | 0x00040000 | Replace older files only on archive extract |

-continued

| | | |
|---|---|---|
| PH_FLAG_DLLVERSIONAVAILABLE | 0x00080000 | DLL File version information is available with file list information |

What is claimed is:

1. A method for distributing a software application residing on a network from a source computer coupled to the network to one or more remote computers, comprising the steps of:

at the source computer, identifying one or more software installation components, wherein the software installation components are used to install the software application;

comparing the identified software installation components to each of the remote computer's software installation components, wherein the comparison determines which of the identified software installation components are absent from each remote computer;

sending the absent software installation components from the source computer to each remote computer that lacks the absent software installation components;

maintaining a description of the identified software installation components on each remote computer;

comparing periodically the description of the identified software installation components to each remote computer's software installation components wherein this periodic comparison identifies one or mere changes made to each remote computer's software installation components and identifies the absent software installation components;

requesting the software installation components absent from each remote computer from the source computer; and re-sending the requested software installation components absent from each remote computer from the source computer to each remote computer, after changes have been made to the software installation components of each remote computer.

2. The method of claim 1, wherein the sending step comprises sending the software installation components via an electronic mail system.

3. The method of claim 1, wherein the sending step comprises sending the software installation components via a modem connected to the network.

4. The method of claim 3, wherein the identified software installation components can be represented as a snapshot or a textual list.

5. The method of claim 1, further comprising the step of dividing the software installation components into at least two packages when the identified software installation components comprise one or more file images.

6. The method of claim 1, wherein at least one remote computer is a laptop computer.

7. The method of claim 1, wherein at least one remote computer is a personal digital assistant.

8. An apparatus for distributing a software application residing on a network, from a source computer coupled to the network, to one or more remote computers that are not coupled to the network, comprising:

(a) a computer;

(b) means, performed by the computer for identifying one or more software installation components that reside on the source computer, wherein the software installation components are used to install the software application;

(c) means, performed by the computer for comparing the identified software installation components to each of the remote computer's software installation components, wherein the comparison determines which of the identified software installation components are absent from each remote computer;

(d) means, performed by the computer for sending the absent software installation components from the source computer to each remote computer that lacks the absent software installation components;

(e) means, for maintaining a description of the identified software installation components on each remote computer;

(f) means, performed by each remote computer for comparing periodically the description of the identified software installation components to each remote computer's software installation components, wherein this periodic comparison identifies one or more changes made to each remote computer's software installation components and identifies the absent software installation components;

(g) means, performed by each remote computer for requesting the software installation components absent from each remote computer from the source computer; and (h) means, for re-sending the requested software installation components absent from each remote computer from the source computer to each remote computer, after changes have been made to the software installation components of each remote computer.

9. An article of manufacture comprising a program storage medium readable by a computer, the medium tangibly embodying one or more programs of instructions executable by the computer to perform method steps for distributing a software application residing on a network, from a source computer coupled to the network, to one or more remote computers that are not coupled to the network, the method comprising the steps of:

at the source computer, identifying one or more software installation components that reside on the source computer, wherein the software installation components are used to install the software application;

comparing the identified software installation components to each of the remote computer's software installation components, wherein the comparison determines which of the identified software installation components are absent from each remote computer;

sending the identified absent software installation components from the source computer to each remote computer that lacks the absent software installation components;

maintaining a description of the identified software installation components on each remote computer;

comparing periodically the description of the identified software installation components to each remote computer's software installation components wherein this periodic comparison identifies one or mere changes made to each remote computer's software installation components and identifies the absent software installation components;

requesting the software installation components absent from each remote computer from the source computer; and re-sending the requested software installation components absent from each remote computer from the source computer to each remote computer, after changes have been made to the software installation components of each remote computer.

* * * * *